United States Patent
Schultz et al.

(10) Patent No.: US 8,476,522 B2
(45) Date of Patent: *Jul. 2, 2013

(54) POWER PANEL

(75) Inventors: Garth J. Schultz, Oxford, MI (US); Scott Leslie, Markham (CA); Ken Buttery, South Lyon, MI (US)

(73) Assignee: Power Panel, Inc., Detroit, MI (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/681,749

(22) PCT Filed: Oct. 3, 2008

(86) PCT No.: PCT/US2008/078822
§ 371 (c)(1),
(2), (4) Date: Apr. 5, 2010

(87) PCT Pub. No.: WO2009/046352
PCT Pub. Date: Apr. 9, 2009

(65) Prior Publication Data
US 2010/0218809 A1 Sep. 2, 2010

Related U.S. Application Data

(60) Provisional application No. 60/977,407, filed on Oct. 4, 2007.

(51) Int. Cl.
*H01L 31/042* (2006.01)
(52) U.S. Cl.
USPC ............................................... 136/248

(58) Field of Classification Search
USPC ......................................................... 136/248
See application file for complete search history.

(56) References Cited

U.S. PATENT DOCUMENTS

| 5,522,944 A | 6/1996 | Elazari |
| 2006/0151022 A1 | 7/2006 | Lawheed |
| 2011/0259402 A1* | 10/2011 | Schultz ......................... 136/248 |

FOREIGN PATENT DOCUMENTS

| JP | 59-032745 A | 2/1984 |
| JP | 11-281166 A | 10/1999 |

* cited by examiner

*Primary Examiner* — Nathan M Nutter
(74) *Attorney, Agent, or Firm* — Harness, Dickey & Pierce, P.L.C.

(57) ABSTRACT

A power panel designed to incorporate a means of both thermal energy production and electrical energy production from the solar energy produced by the sun. The power panel comprises: a synthetic molded enclosure comprising a solar radiation top surface, bottom surface and sidewalls; and a transparent panel disposed on said synthetic molded enclosure. The transparent panel is adapted to insulate the thermal energy captured by the liquid circulating in the enclosure. The enclosure includes a plurality of segmented partitions adapted to form liquid pathways for channeling a liquid through the enclosure when the transparent panel is disposed on the segmented partitions thereby forming a liquid boundary in proximate contact with the segmented partitions and with the liquid in said enclosure. The power panel can also generate electrical power by incorporating a solar panel disposed between the enclosure and the transparent panel, wherein the solar panel forms a liquid boundary for the liquid circulating in the synthetic enclosure.

21 Claims, 7 Drawing Sheets

POWER PANEL

CROSS-REFERENCE TO RELATED APPLICATIONS

This application claims the benefit of U.S. Provisional Application No. 60/977,407, filed on Oct. 4, 2007. The entire disclosure of the above application is incorporated herein by reference.

FIELD

The present disclosure relates to solar panels for capturing the energy of the sunlight for heat, electricity, and air conditioning. More particularly, the present technology relates to a solar panel which can function individually or be linked together to create a source of thermal and electrical energy.

BACKGROUND

The statements in this section merely provide background information related to the present disclosure and may not constitute prior art.

Each day, the sun provides 10,000 times the amount of energy utilized by the human race. In a single day, it provides more energy than our current population would consume in 27 years. In North America alone, it is believed that close to two trillion dollars is spent annually on energy, much of which is designated towards non-renewable, carbon-based sources, such as oil, coal, and other fossil fuels. When energy consumption for the average U.S. household is approximately 65-80% thermal and approximately 20-35% electrical, it makes sense to derive a means of satisfying both of these requirements through renewable sources.

There have been many advances in the past few decades toward the capture of renewable energy resources, such as water turbines (which convert the kinetic energy of moving water into electricity), wind generators (which convert the energy of the wind into electrical energy), geothermal heating (which utilizes the stability of the subterraneous temperature to provide thermal energy), and solar cells (which allow the capture and conversion of solar energy into electrical energy).

Solar panels are manufactured by joining individual solar cells to form a strip or series of individual cells which are mounted in a tray having a substantially flat mounting surface. The cells are adhered to the tray and are surrounded or encapsulated within a transparent material in such a manner that light entering the solar panel will pass substantially unobstructed through the transparent encapsulant for the cells and will impinge upon exposed surfaces of the individual solar energy cells. Typically, a solar panel is formed from at least one solar energy cell in the form of a thin, 3-inch diameter wafer that has one of its two planar surfaces adhered to the flat base of the tray that comprises the base element of the solar panel and the other planar surface of the cell directed toward the open top of the tray and in position to receive light impinging thereupon. The transparent material is usually selected from those that will not only provide minimal obstruction to the passage of light through the encapsulating material to the exposed planar surface of the cell, but which will also have optimal weathering characteristics to protect the encapsulated cells from ambient conditions. An example of this can be found in U.S. Pat. No. 4,057,439, issued to Lindmayer.

An alternative type of renewable energy is a solar thermal heat exchanger, which utilizes the energy of sunlight to heat a liquid, thereby providing thermal energy for heating or cooling. In this type of energy harnessing, typically a flat plate is blackened on the front to improve absorption of solar radiation and is arranged with its blackened surface facing the sun and sloped at a suitable angle to optimize the energy collected. A series of tubes is secured to the panel, and water to be heated is circulated through these tubes to extract the heat received by the panel. The back of the panel is often insulated by a layer of insulating material such as glass wool or plastic foam.

In most cases, these panels include a frontal screen made of glass or transparent plastics material, such as transparent acrylic or PVC, which allows solar radiation to pass through the screen onto the panel and retains the heat by reducing losses caused by re-radiation or convection cooling.

The warmed water from solar panels is normally circulated through a separate tank so that the temperature may build up to a maximum value being a balance between the heat input and heat losses in the system. This water is then used as feed water for the main hot water tank, as hot water is drawn off from the system. As this water is generally only warm, except in very hot weather or when the panel is used in hot climates, it cannot be used directly as hot water, and a separate heater in the main hot water tank is necessary to heat the water to usable temperatures. It is also clear that water from the solar panel cannot be used generally for maintaining the temperature of the hot water in the main tank. An example of this type of renewable energy source can be found in U.S. Pat. No. 4,089,957, issued to Bennett.

While these types of solar energy harnessing are efficient in their own capacity, they do not provide for an economical source of both thermal and electrical energy which can be utilized throughout households of the world.

SUMMARY

It is therefore an object of the present technology to provide a power panel which may provide thermal energy and electrical energy from the conversion of the light emitted from the sun.

In one aspect, a power panel for generating thermal and electric energy from solar radiation is provided. The power panel can have a synthetic molded enclosure having a solar radiation top surface, bottom surface and sidewalls; and (b) a transparent panel disposed on the synthetic molded enclosure. The transparent panel can be adapted to insulate the thermal energy contained within the power panel enclosure. The enclosure can have a one or more segmented partitions adapted to form liquid pathways for channeling a liquid through the pathways when said transparent panel is disposed on the segmented partitions thereby forming a liquid boundary in proximate contact with the segmented partitions and with the liquid in the enclosure. The partitions provide for a designed flow of liquid on the surface of the power panel enclosure maximizing the capture of thermal energy from the sun.

In still a further aspect, the power panel can also include a photovoltaic panel for generating electrical power disposed between the synthetic molded enclosure and the transparent panel. The photovoltaic panel can have one or more solar cells disposed on the panel for generation of electricity.

It is another object of the present technology to overcome the deficiencies of the prior art provide a power panel which is highly efficient in design, providing minimal energy loss.

A further object of the present technology is to provide a power panel which can be implemented as a stand alone unit or linked together to increase the energy production, depending on the individual application of each unit.

These and other objects will become apparent from the present technology comprising a power panel designed to incorporate a means of both thermal energy production and electrical energy production from the solar energy produced by the sun. The panels can be utilized individually or linked together to provide a greater net energy production, depending upon the application. The individual panels are manufactured by a cost-effective, automotive-style manufacturing process already utilized in other fields, which would significantly lower consumer installed energy costs. The power panels are manufactured in three configurations: a photovoltaic and thermal panel (PVT), which would provide 8%-40 watts of electrical energy and up to 500 watts of thermal energy per panel; a second, thermal-only power panel, which would provide up to 550 watts of thermal energy; and, lastly, a concentrated photovoltaic thermal panel (CPVT), which would provide 32%-240 watts of electrical energy and up to 300 watts of thermal energy per panel. All three embodiments vastly reduce the typical solar-per-watt costs and eliminate the problem of current tight supply of traditional silicon solar cells.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
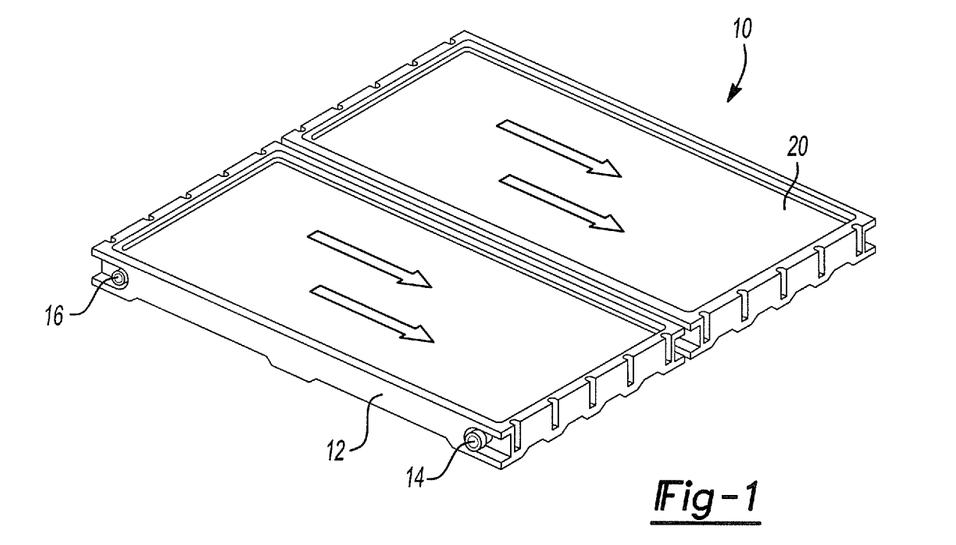
FIG. 1 is a perspective view of the two linked power panels comprising the preferred embodiment of the present technology.
Figure 1A:
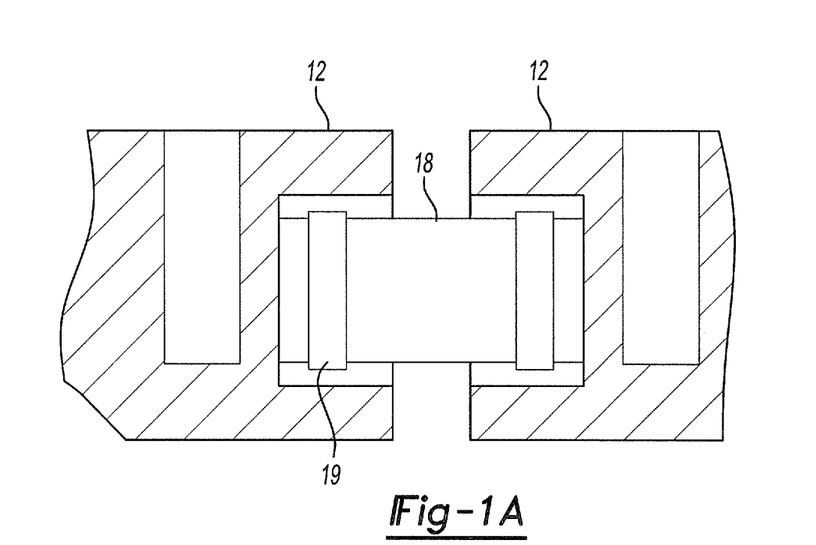
FIG. 1A is a partial, cross-sectional side view of the connection element linking one or more power panels together.
Figure 3:
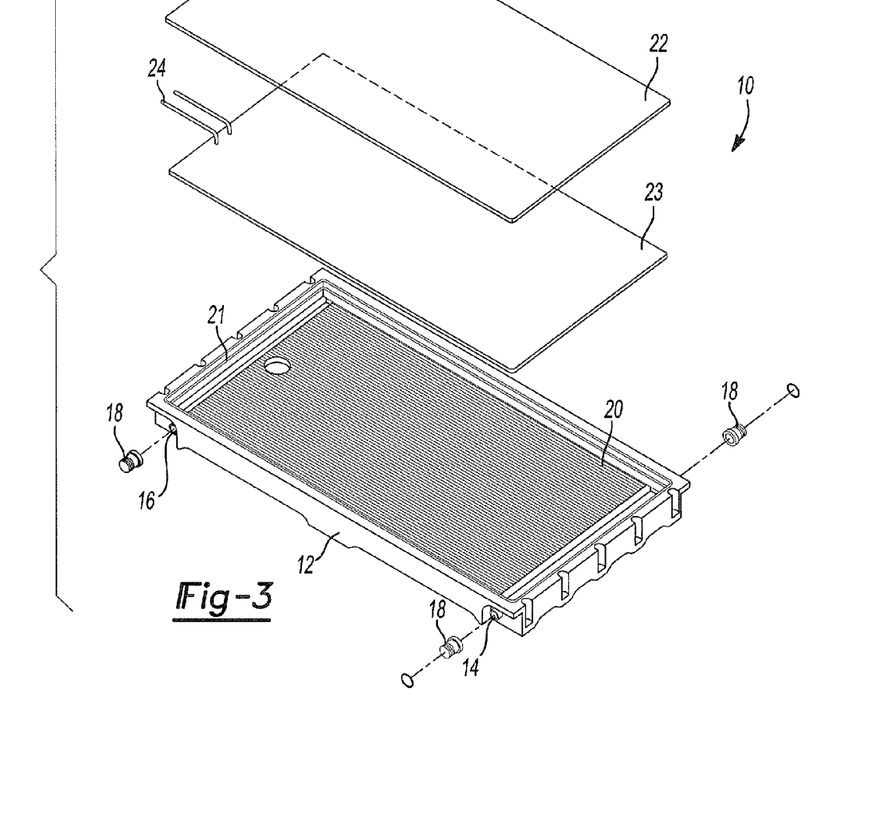
FIG. 3 is an exploded, assemblage view of the components according to the present teaching.

Referring now to the figures, particularly FIGS. 1, 1A, and 3, an embodiment of the present technology comprising a power panel 10 is shown. The power panel 10 comprises a generally rectangular-shaped, expanded polypropylene enclosure 12 having a solar energy absorption portion 20. The solar energy absorption portion 20 includes a series of longitudinal channels, indicated by the arrows of FIG. 1. The channels are defined by parallel segmented partitions disposed on the top surface of the enclosure 12 through which liquid is conducted. The liquid, for example, distilled water, is pumped into the input port 16 wherein it travels through an input trough, which disperses the liquid evenly along the longitudinal channels. The liquid travels down the longitudinal channels of the absorption portion 20 and is collected in a lower, perpendicular output trough which directs the flow out to the output port 14.

Figure 5:
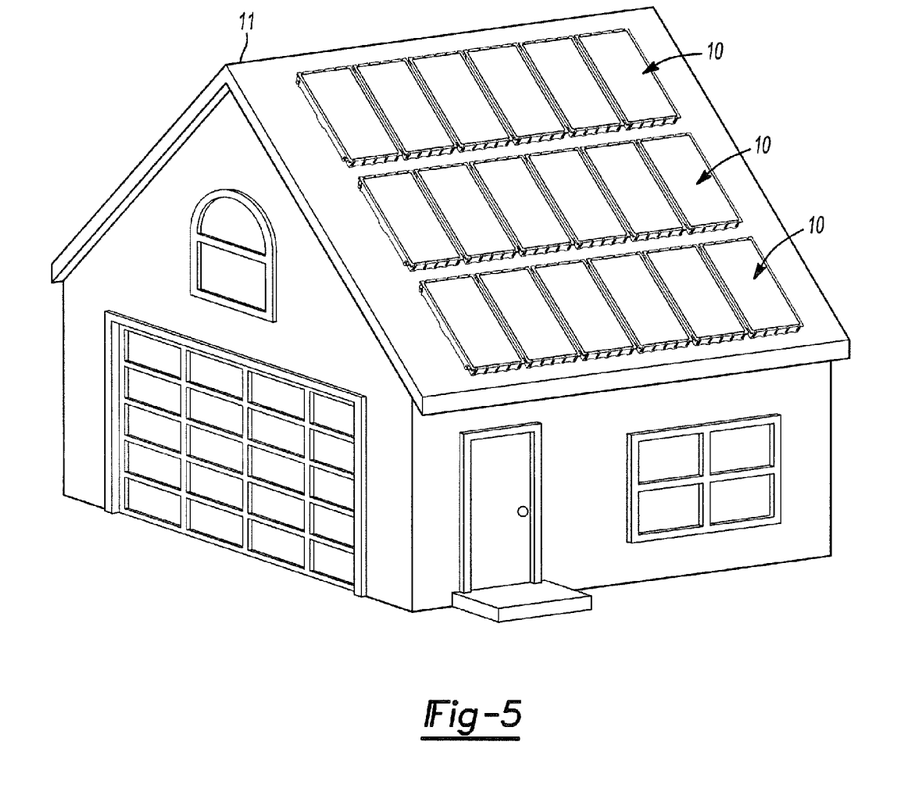
FIG. 5 is a perspective illustration of a plurality of power panels comprising the preferred embodiment of the present technology implemented in series upon a building structure.

As stated, the power panel 10 can be installed as stand-alone units or can be linked together in series to form a larger energy-production means, for example a power generating panel array as shown in FIGS. 1 and 5. In order to link two or more panels 10 together, the enclosures 12 are molded so as to allow the input port 16 and output port 14 to align horizontally with adjacent panels. A journal conduit 18 connects adjacent input port 16 and output port 14 on adjacent power panels, wherein a sealing and securing means 19 is implemented between the conduit 18 and each enclosure input 16 or output 14 to ensure a secure, leak-free connection as shown in FIG. 1A.

In some embodiments of the present technology, the power panel 10 can consist of a synthetic molded enclosure 12 comprising a solar radiation absorption top surface 20, a bottom surface and sidewalls. The top absorption surface of the enclosure 12 can be painted black to enhance solar radiation absorption and heat the liquid circulating on the top surface of the enclosure 12. The enclosure also includes a transparent panel 22 disposed on the enclosure 12, the transparent panel 22 is adapted to insulate the thermal energy contained within the enclosure 12. Liquid is channeled through the power panel 10 by adding a plurality of segmented partitions 40 which are adapted to form liquid pathways for channeling a liquid through the pathways when the transparent panel 22 is disposed on the segmented partitions 40 thereby forming a liquid boundary in proximate contact with the segmented partitions 40 and with the liquid in said enclosure 12.

The power panel 10 can also be manufactured having an electrical generation, in addition to its thermal energy capture capability by including a photovoltaic panel 23 as shown in FIGS. 1C and 3. The photovoltaic panel 23 can generate electrical power directly from the solar radiation contacting the surface of the power panel 10. The photovoltaic panel 23 forms a liquid boundary or "lid" that is in proximate contact with the liquid circulating through the enclosure 12. This contact between the photovoltaic panel 23 and the circulating liquid serves to provide a thermal and liquid seal between the enclosure 12 and the external environment, but also captures any incident heat generated by the solar cells disposed on the photovoltaic panel 23.

Figure 2:
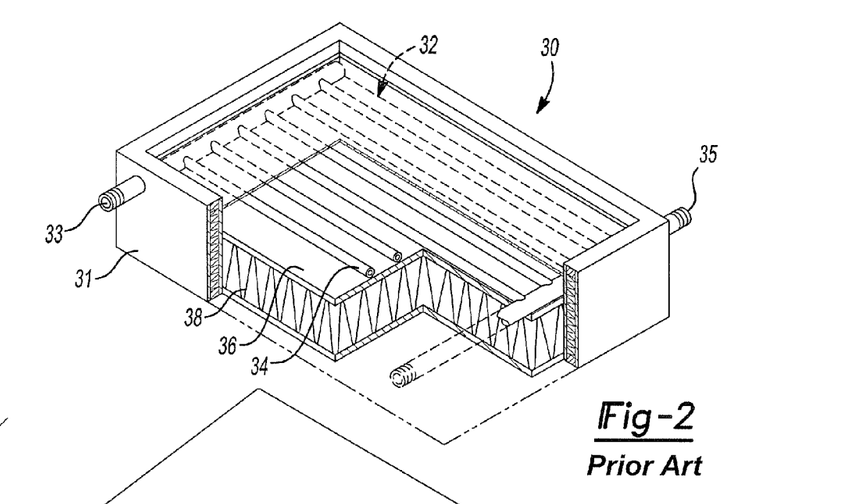
FIG. 2 is a partial perspective view of a prior art heat exchanger collector plate known in the art.

The power panel 10 described herein is superior over conventional flat plate heat exchange collectors 30 illustrated in FIG. 2. These collectors 30 typically consist of an enclosure 31 having a liquid inlet 35, a liquid outlet 33, and a series of longitudinal liquid pipes 34 connecting the two. The longitudinal pipes 34 are generally copper and attached to a copper absorber plate 36, which absorbs the solar energy, transferring the heat to the liquid within the pipes 34. A cover sheet 32, typically made of glass, is implemented to protect the pipes 34 and absorber plate 36. The absorber plate 36 is insulated 38 from the enclosure and structure to which the collector 30 is attached. The present power panel 10 is superior in design and efficiency over these prior art collectors in that the channels through which the liquid flows is molded into the enclosure 12 and is insulated from the outside of the enclosure 12 as well as the structure to which the power panel 10 is mounted.

Figure 3A:
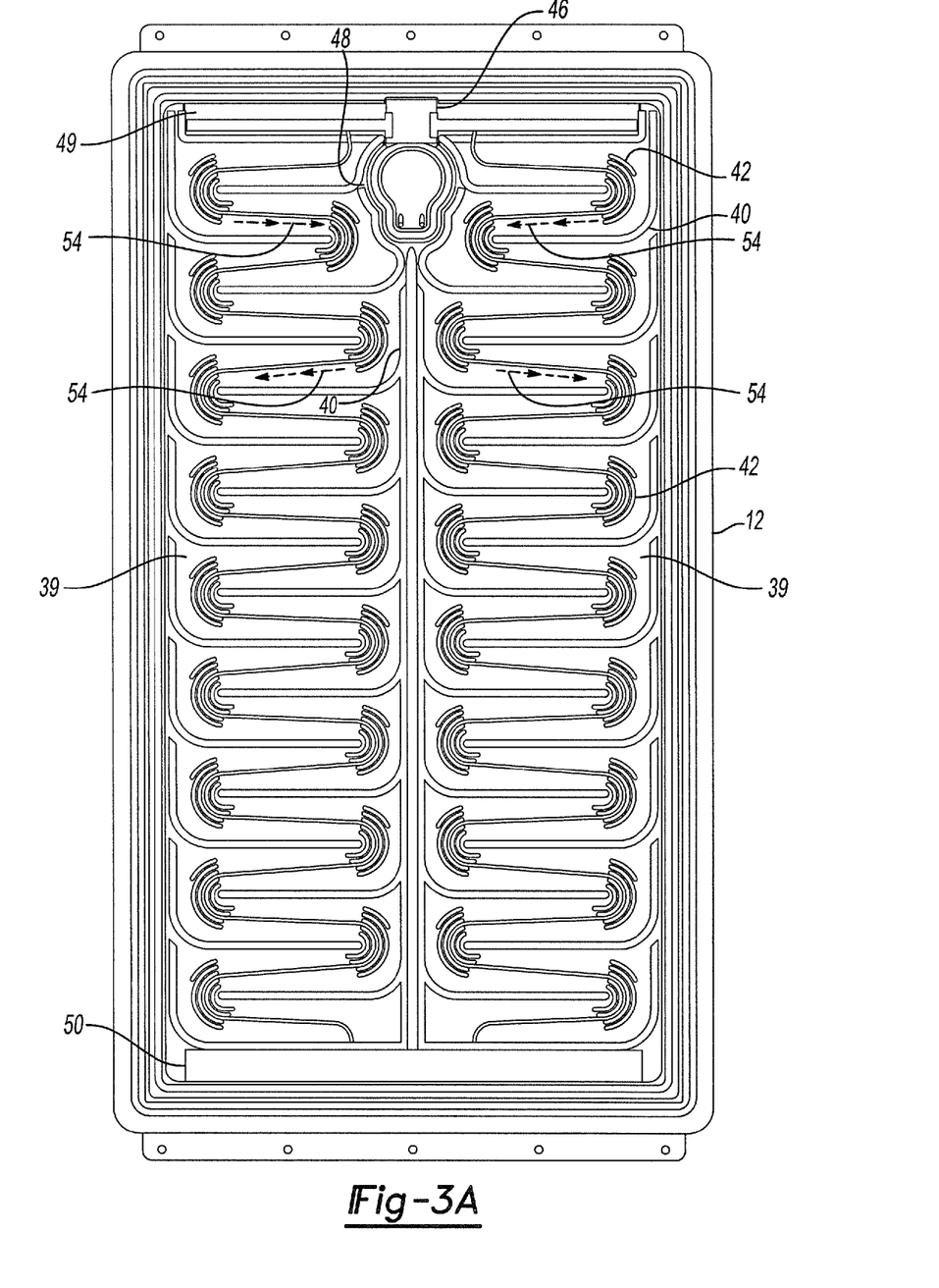
FIG. 3A is a top view of the enclosure illustrating a top surface of the enclosure shown in FIG. 3.
Figure 3B:
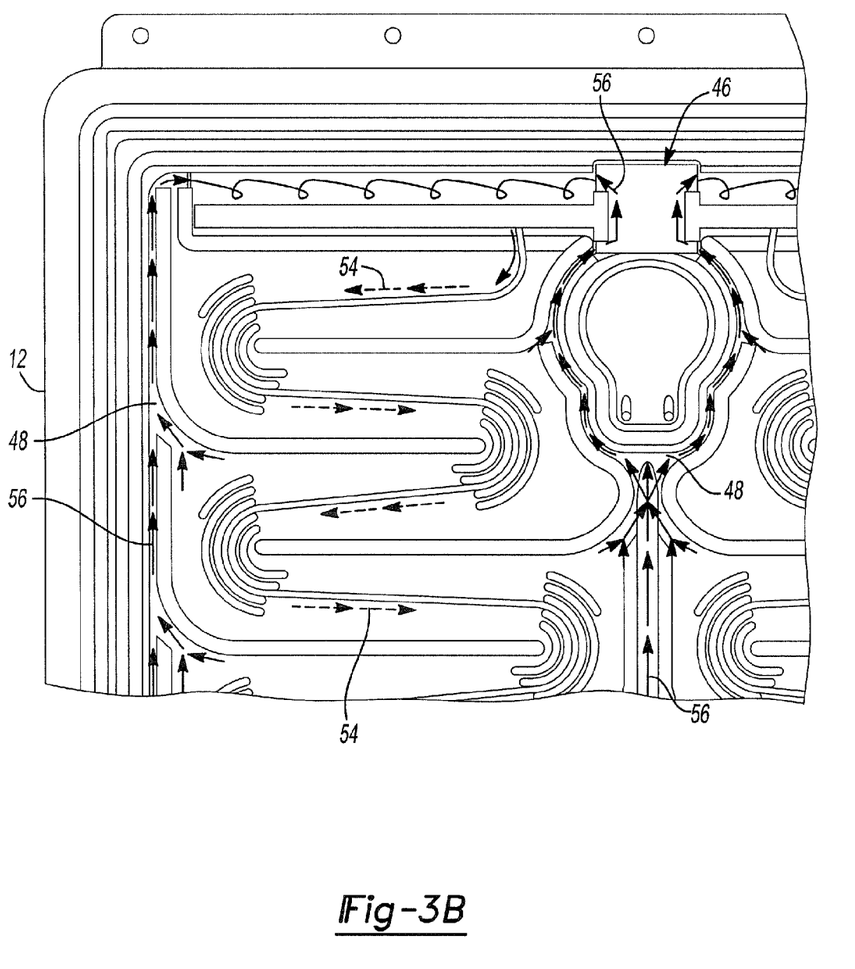
FIG. 3B is a partial plan view magnification of FIG. 3A, illustrating the liquid pathways and vented air paths defined by the partitions and turning veins of the enclosure.
Figure 3C:
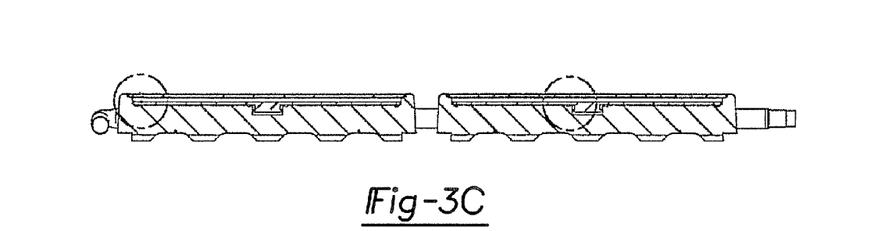
FIG. 3C is a cross section view of two attached power panels in series.

In some embodiments of the present technology, best illustrated in FIGS. 3, 3A and 3B, the power panel 10 is shown having an electric photovoltaic panel 23 which is comprised of a plurality of solar cells fitted over the absorption portion 20 of the enclosure 12. The type of photovoltaic panel 23 is not critical, other than the requirement that the photovoltaic panel 23 must be dimensioned to fit within the sides of enclosure 12 and form an insulating seal with respect to liquid flowing in contact with the photovoltaic panel 23. The number of solar cells disposed on the photovoltaic panel 23 is not critical. In some embodiments, suitable photovoltaic panels for use as the photovoltaic panel 23 of the present technology are also commercially available, e.g. the thin-film photovoltaic panel: EPV-42 sold by Energy Photovoltaics, Inc. (Robbinsville, N.J., USA). This allows for the collection of electrical energy, which is transferred through conduit 24 attached to the photovoltaic panel 23 to a remote power storage unit (not shown), as well as the collection of thermal energy from the channels of liquid flowing through the enclosure 12 below. The photovoltaic panel 23 serves as the top boundary for the liquid traveling through the liquid pathways 54 within the enclosure 12 and acts as an insulator for the fluid flow. A clear, tempered-glass top glazing 22 is fitted over the assembly and is not only sealed to the enclosure 12 by a weather-tight seal 21, yielding a closed system, but further insulates the assembly, providing much greater energy efficiency for the power panel 10.

Referring now to FIGS. 3, 3A and 3B, the enclosure 12 is shown in plan view exposing the solar radiation exposed top surface. The enclosure 12 can be manufactured from a one-piece molded material. In general, the enclosure 12 is rectangular in shape. The enclosure 12 can be molded, for example, compression molded, from a synthetic material that is resistant to UV radiation and compatible with liquids such as water. In some embodiments, the enclosure 12 is molded from a thermoplastic polyolefin. In some embodiments, the thermoplastic polyolefin can include one or more well-known thermoplastic polyolefins comprising a mixture of polypropylene and an olefinic based rubber. In some embodiments, suitable compositions for use in compression molding of the enclosure 12 are also commercially available e.g. the thermoplastic polyolefin (TPO): SEQUEL E3000 sold by Solvay Engineered Polymers Inc. (Auburn Hills, Mich., USA).

The top surface 39 of enclosure 12 also includes a plurality of segmented partitions 40 which are generally placed on the top surface 39 of enclosure 12. The segmented partitions 40 are placed on the top surface 30 to create liquid pathways 54 shown as dashed arrows in FIGS. 3A and 3B. The liquid pathways 54 originate from the inlet trough 49 and terminate at the outlet trough 50. The liquid pathways 54 are generally serpentine is shape but can be customized to form any shape as defined by the placement of the segmented partitions 40 and turning veins 42. As shown in FIG. 3A, the top surface 39 is divided into two general regions, each region containing a plurality of segmented partitions 40 and a plurality of turning veins 42. In some embodiments, the generally L shaped segmented partitions 40 as shown in FIG. 3A can be separated by a distance ranging between 1.0 cm to about 10 cm. The top surface 39 is shown with two liquid pathways 54. However, it is envisioned, the arrangement of segmented partitions 40 and turning veins 42 to define different liquid pathways 54 that are adapted to channel a liquid through the enclosure in a predetermined manner can be modified. In general, the flow of liquid from the inlet trough 49 to the outlet trough 50 is dependent on gravity flow and the pitch of the power panel 10 on the surface of a solar radiation exposed surface, for example the slope of the roof on which the power panel 10 is attached in relation with the surface of the ground.

In some embodiments, the segmented partitions 40 and turning veins 42 are made from a structured sealant. The structured sealant is applied to the top surface 39 of molded enclosure 12 prior to the mounting of the photovoltaic panel 23 onto the enclosure. Once the photovoltaic panel 23 is mounted on the top surface 39 of enclosure 12, a contained space between the photovoltaic panel 23 and the top surface of enclosure 12 is formed. The segmented partitions 40 and turning veins 42 are disposed in the top surface 39 of enclosure 12 and have a height of about 0.01 mm and about 10.0 mm, providing a contained space between the photovoltaic panel 23 and the top surface 39 of enclosure 12 of about 0.01 mm to about 10 mm, more preferably from about 0.1 mm to about 5.0 mm, and still most preferably from about 0.125 mm to about 3.0 mm. The contained space between the photovoltaic panel 23 and the top surface 39 of enclosure 12 will provide liquid pathways that are defined by the segmented partitions 40 and the turning veins 42 as shown by the dashed arrows. The photovoltaic panel 23 is disposed on top of the segmented partitions 40 and turning veins 42, which aids in adhering the photovoltaic panel 23 to the enclosure 12. The segmented partitions 40 and turning veins 42 can be made from a structured sealant/adhesive having the adhesion and mechanical properties of urethane along with the flexibility and ultraviolet radiation resistance of silicone. The structured sealant can comprise a single polymer or a mixture of polymers. In some embodiments, the structured sealant can include one or more silyl modified polymers. Silyl modified polymers are cross-linkable by treatment with a water/silanol condensation catalyst. Silyl modified polymers can include, for example, copolymers of ethylene, propylene or 1-butene with unsaturated silane compounds; graft polymers prepared by grafting unsaturated hydrolysable silane compounds onto polyethylene or other suitable polymers; or polymers which have hydrolysable groups introduced therein by transesterification. Useful silyl modified polymers for use as the segmented partitions 40 and turning veins 42 are described in U.S. Patent Publication Number 2006/0036008, Ser. No. 11/140,230, published Feb. 16, 2006.

In some embodiments, suitable structured sealant/adhesive compositions for use as the segmented partitions 40 and turning veins 42 disposed on the top surface 39 of enclosure 12 are also commercially available e.g. the moisture cured silyl modified polymer structured sealant: 940 FS sold by Bostik (Wauwatosa, Wis., USA). FIG. 3B shows in particular the liquid pathways 54 created by the segmented partitions 40 and turning veins 42 which are made from a structured sealant or adhesive. The segmented partitions 40 and turning veins 42 as shown in FIG. 3B not only define liquid pathways 54 shown in dashed arrows, but also provide a path for air in the enclosure to escape to exterior of enclosure 12 through vented air flow paths as indicated by the solid arrows 56. Thus, the enclosure 12 also provides for ventilated air flow within the enclosure 12. In some embodiments, the volume of water circulated through enclosure 12 ranges from about 0.38

L/min (0.1 gal/min) to about 7.57 L/min (2.0 gal/min). In operation, the temperature of the circulating liquid, for example, water, can range from about 20° C. to about 70° C.

Figure 3D:
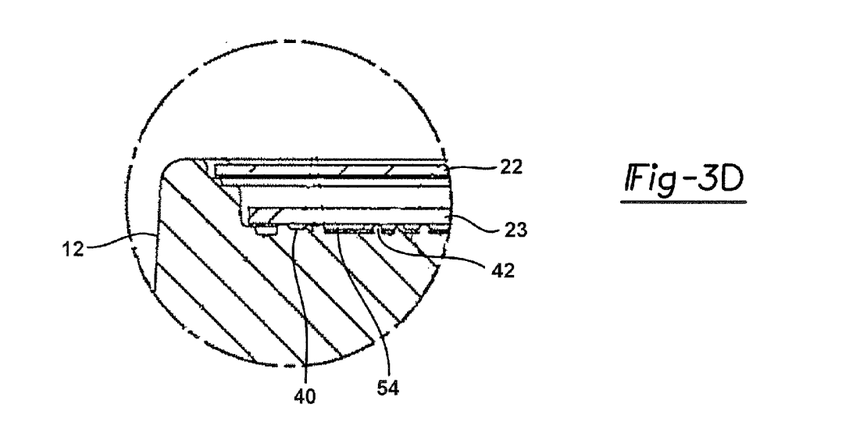
FIG. 3D is a cross section of a magnified corner portion of FIG. 3C showing the relative position of the top cover, photovoltaic panel and flow of liquid.
Figure 3E:
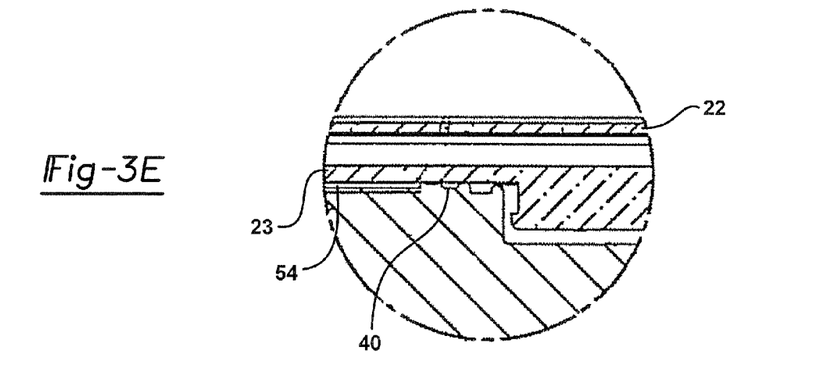
FIG. 3E is a cross section of a magnified center portion of FIG. 3C showing the relative position of the top cover, photovoltaic panel puck and flow of liquid.

As best illustrated in FIG. 3B, a bridge 46 is mounted onto the top surface 39 of enclosure 12. Bridge 46 can be made from any material that is compatible with segmented partition 40 and can be mounted onto the top surface 39 of the enclosure 12. In some embodiments, the bridge 46 can be made from a thermoplastic polyolefin. Bridge 46 connects the venting system of enclosure 12 to a reservoir (not shown) attached to the power panel 10. The bridge 46 is adapted to release the air present in the enclosure 12 along air flow path marked by the solid arrows 56 to exit the enclosure 12 and into the reservoir (not shown). Bridge 46, when properly bonded to the enclosure 12 and sealed to the photovoltaic panel 23 (using a segmented partition 40), acts as a snorkel when power panel 10 is laid at an angle. The bridge 46 allows the evacuated air to flow to a point higher than the water level in the inlet trough 49, while also keeping the water out of the air venting system. Due to the different densities found in the liquid and the air, as the power panel 10 fills with water, air is pushed through these corners and evacuate 'up' and then over bridge 46, into the volume of air in the inlet trough 49. FIGS. 3D-3E illustrate the general top surface layers of power panel 10. As shown in FIGS. 3D-3E, the partitions 40 and turning veins 42 along with photovoltaic panel 23 define the walls for channels or flow paths 54 for the passage of liquid. The present enclosure advantageously provides the flow of liquid through flow paths 54 from a first end of enclosure 12 to a second end of enclosure 12. The passage of liquid through flow paths 54 enables the collection of heat incident to the sun's rays. Furthermore, heat emitting from the photovoltaic panel 23 which is in contact with liquid in flow paths 54 is collected by the liquid and improves the efficiency of the photovoltaic panel 23. In addition, as illustrated in FIGS. 3B, 3D and 3E the partitions 40 provide a path for air to vent and equilibrate the power panel 10. Flow of venting air is shown as solid arrows 56. Thus the arrangement and position of the partitions and turning veins 42 define flow paths 54 and 56 which improves the efficiencies of the heat collection and air flow within the enclosure 12. The vented air eventually travels up through the panel 12 and exits through the bridge 46.

Figure 4:
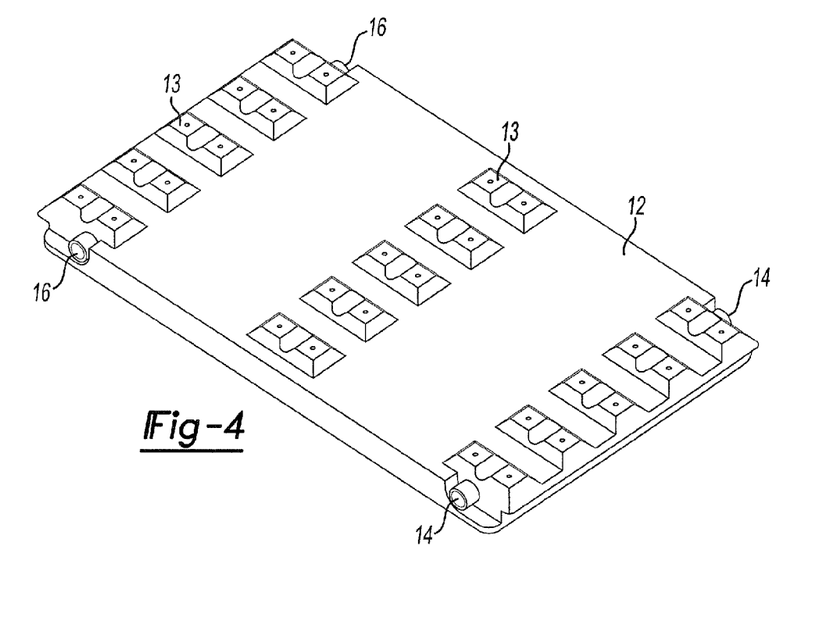
FIG. 4 is a perspective view of the bottom surface of the enclosure element of the power panel of the present technology.
Figure 4A:
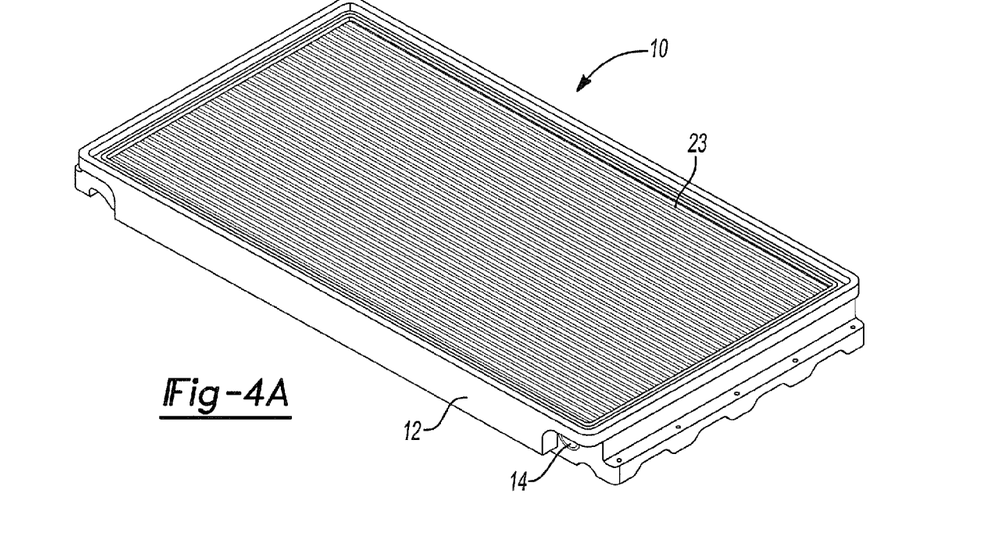
FIG. 4A is a perspective view of an alternate embodiment of the power panel 10 with the photovoltaic panel placed within and on top of the enclosure.

In some embodiments, the segmented partitions 40 can be linear and in horizontal rows, where the path of liquid flow is vertical with respect to the inlet trough 49 and the outlet trough 50. As shown in FIG. 4A the alternative embodiment comprises a plurality of parallel segmented partitions 40. The enclosure is sealed with the placement of a photovoltaic panel 23 on top and in contact with the segmented partitions 40. The photovoltaic panel 23 is then overlayed with a transparent panel 22 to protect the solar cells disposed on the solar radiation exposed surface of photovoltaic panel 23.

The enclosure 12 has great chemical and weather-resistance and may be attached alone or in series to a multitude of surfaces, providing they fall within the preset slope parameters allowing the liquid to flow efficiently through the power panel 10. As shown in FIG. 4, a plurality of raised platforms 13 are molded into the enclosure 12 bottom, allowing the mounting of the power panel 10 to the desired solar radiation exposed surface (for example, a roof of a dwelling or commercial property, a mounted post with an attached board facing the solar radiation and the like) via simple lag screws. A power generating panel array operable to generate hot water and solar derived electrical energy can be made using the power panel 10 described herein. The power panel 10 can be installed in a series of 1 by X, in any number allowable for the given area along the solar radiation exposed surface of any structure 11, as illustrated in FIG. 5.

What is claimed is:

1. A power panel for generating thermal and electric energy from solar radiation, the power panel comprising:
    (a) a synthetic molded enclosure comprising a solar radiation top surface, bottom surface and sidewalls; and
    (b) a transparent panel disposed on said synthetic molded enclosure, said transparent panel adapted to insulate said thermal energy contained within said enclosure;
    wherein said enclosure comprises a plurality of segmented partitions adapted to form liquid pathways for channeling a liquid through said pathways when said transparent panel is disposed on said segmented partitions thereby forming a liquid boundary in proximate contact with said segmented partitions and with said liquid in said enclosure.

2. The power panel according to claim 1, further comprising a photovoltaic panel for generating electrical power disposed between said synthetic molded enclosure and said transparent panel, said photovoltaic panel comprising a plurality of solar cells.

3. The power panel according to claim 2, wherein said enclosure further comprises a plurality of turning veins disposed on said top surface, said turning veins configured to further channel liquid circulating through said enclosure.

4. The power panel according to claim 2, wherein said segmented partitions and said channel veins comprise a synthetic moisture cured silyl modified polymer, said silyl modified polymer adapted to have a melting temperature above 70° C.

5. The power panel according to claim 4, wherein said silyl modified polymer is a silyl-modified polyether polymer, a silyl-modified polyether-urethane polymer, a silyl-modified polyester polymer, a silyl-modified polyester-polyurethane polymer or combinations thereof.

6. The power panel according to claim 2, wherein said plurality of solar cells comprise photoreceptive upper surface, oriented generally toward a source of solar radiation, said solar cells being rigidly coupled to a top surface of a transparent panel, said panel having a bottom surface in liquid communication with said liquid flowing in said enclosure.

7. The power panel according to claim 6, wherein said transparent panel comprises glass.

8. The power panel according to claim 2, said enclosure further comprising a foam insulation.

9. The power panel according to claim 2, said enclosure further comprising an inlet trough disposed at a first end of said enclosure and an outlet trough disposed at an opposite second end of said enclosure, said inlet trough and said outlet trough in liquid communication with said pathways.

10. The power panel according to claim 9, wherein said enclosure comprises at least one inlet port and at least one outlet port said ports attached to said enclosure and are configured to provide a liquid path for liquid in said enclosure to enter into said inlet trough and a liquid path for said liquid to exit from said outlet trough in said enclosure.

11. The power panel according to claim 2, wherein said enclosure further comprises a plurality of molded raised platforms disposed on said bottom surface of said enclosure, said platforms are adapted to be secured to a solar radiation exposed surface.

12. The power panel according to claim 2, wherein said enclosure having a plurality of liquid pathways having walls defined by said photovoltaic panel and said segmented partitions and a plurality of turning veins.

13. The power panel according to claim 2, wherein said enclosure comprises a plurality of vented air pathways having walls defined by said photovoltaic panel and said segmented partitions and a plurality of turning veins.

14. The power panel according to claim 2, further comprising a bridge adapted to channel vented air within said enclosure to an external reservoir.

15. A power generating panel array comprising an array of power panels defined in claim 2, said power panels connected to each other in series.

16. A power panel for generating thermal and electric energy from solar radiation, the power panel comprising:
   (a) a photovoltaic panel for generating electrical power, said photovoltaic panel comprising a plurality of solar cells;
   (b) a synthetic molded enclosure comprising a top surface, a bottom surface and side walls, said top surface being in contact with said photovoltaic panel, said top surface oriented towards said solar radiation and comprising a plurality of segmented partitions and a plurality of turning veins said partitions and veins defining non-parallel passage ways for a liquid to travel from an inlet trough disposed at a first end of said enclosure to an outlet trough disposed at the opposite end of said enclosure; and
   (c) a transparent panel disposed on said photovoltaic panel, said transparent panel adapted to insulate said thermal energy contained within said enclosure and protect said photovoltaic panel;
   wherein said enclosure includes at least two conduits attached to said inlet trough and said outlet trough, said conduits are configured to provide a liquid path for said liquid in said enclosure to enter into said inlet trough and a liquid path for said liquid to exit from said outlet trough, said conduits being sealed with respect to said enclosure.

17. The power panel according to claim 16, wherein said photovoltaic panel is disposed within said enclosure sidewalls and in proximate contact with said plurality of segmented partitions and a plurality of turning veins thereby defining a contained space and a boundary for a flow of liquid through said non-parallel passage ways.

18. The power panel according to claim 16, wherein the molded enclosure comprises molded thermoplastic polyolefin.

19. The power panel according to claim 16, further comprising a bridge adapted to channel vented air within said enclosure to an external reservoir.

20. A power generating panel array comprising an array of power panels defined in claim 16, said power panels connected to each other in series.

21. A power panel for generating thermal and electric energy from solar radiation, the power panel comprising:
   (a) a photovoltaic panel for generating electrical power, said photovoltaic panel comprising a plurality of solar cells;
   (b) a synthetic molded enclosure comprising a top surface, a bottom surface and side walls, said top surface is in contact with said photovoltaic panel, said top surface oriented towards said solar radiation and comprising a plurality of segmented partitions and a plurality of turning veins defining non-parallel passage ways for liquid to travel from a liquid inlet tube to a liquid outlet tube;
   (c) a transparent panel disposed on said photovoltaic panel, said transparent panel adapted to insulate said thermal energy contained within said enclosure and protect said photovoltaic panel; and
   (d) a bridge connected to said enclosure adapted to vent air in said power panel to a reservoir;
   wherein said enclosure includes at least one inlet port and at least one outlet port configured to provide an inlet and an outlet for said fluid to pass into and out of said enclosure, said inlet and outlet ports are sealed with respect to said enclosure and wherein said input port and said output port are connected to adjacent input and output ports with a journal conduit having a means to secure said connection between said adjacent inlet and outlet ports.

* * * * *